M. W. KOUNS, DEC'D.
A. B. WHITNEY, ADMINISTRATOR.
REVERSIBLE TRANSMISSION GEARING.
APPLICATION FILED SEPT. 7, 1909.
953,846.
Patented Apr. 5, 1910.
2 SHEETS—SHEET 2.
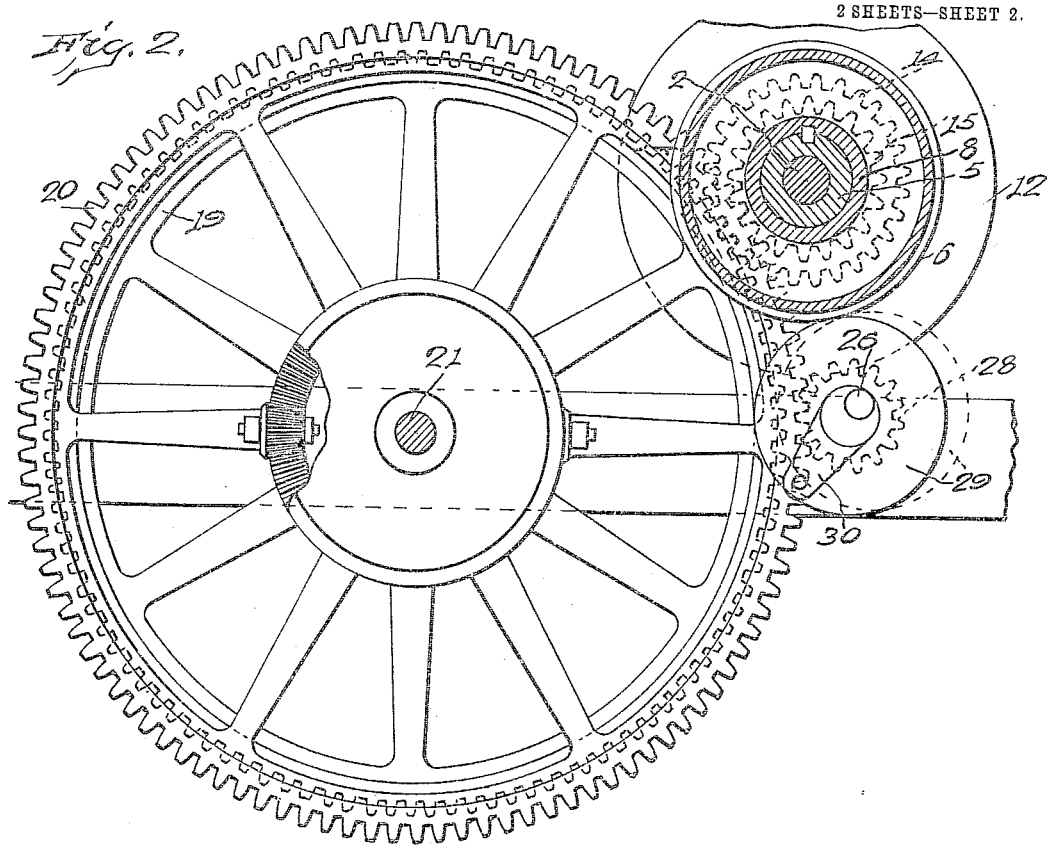
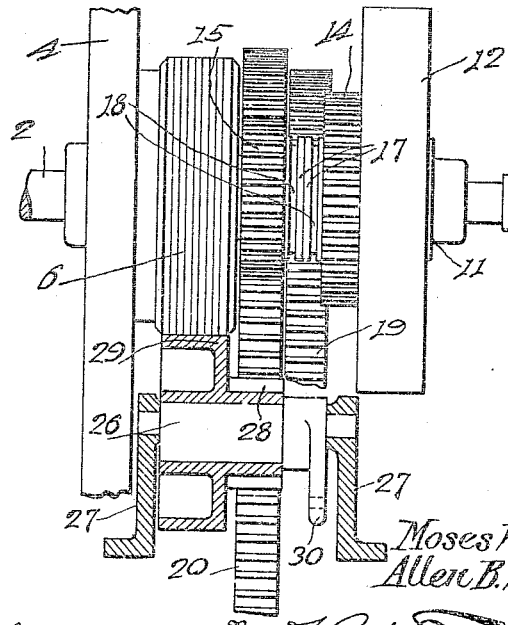
Witnesses
G. Howard Walmsley
Edward Reed
Inventor
Moses W. Kouns, Dec'd,
Allen B. Whitney, Admr.
By
Attorney

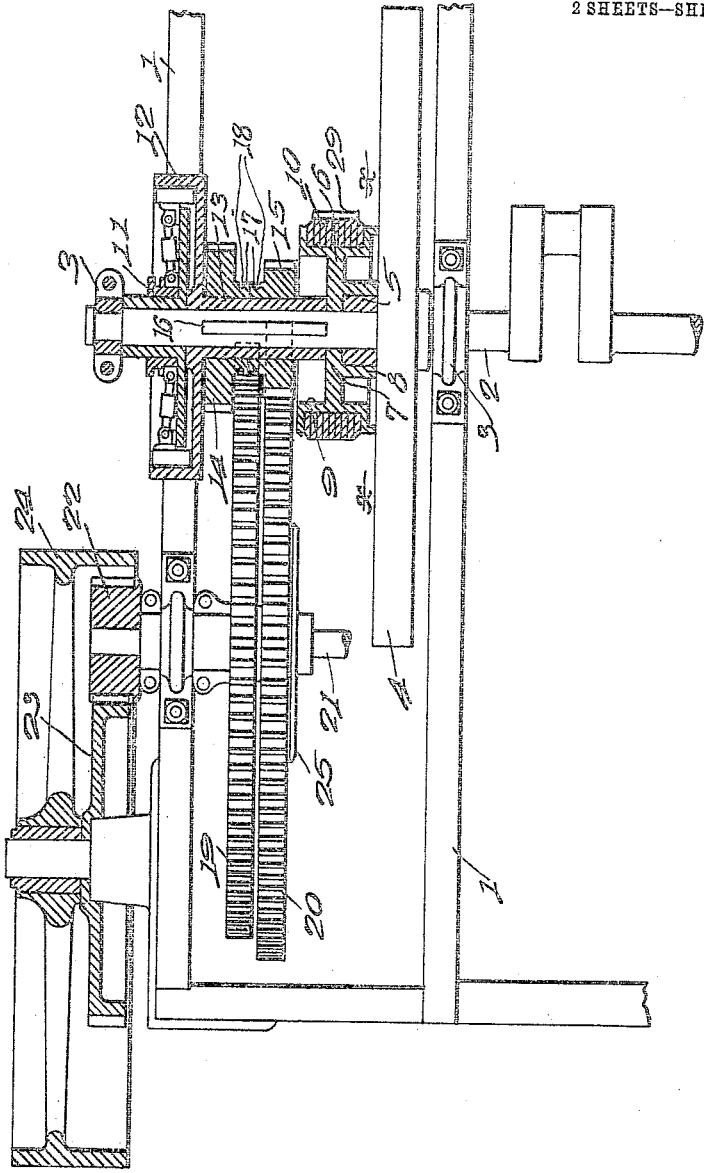

UNITED STATES PATENT OFFICE.

MOSES W. KOUNS, DECEASED; ALLEN B. WHITNEY, OF UPPER SANDUSKY, OHIO, ADMINISTRATOR, ASSIGNOR TO THE OHIO MANUFACTURING COMPANY, OF UPPER SANDUSKY, OHIO, A CORPORATION OF OHIO.

REVERSIBLE TRANSMISSION-GEARING.

953,846.      Specification of Letters Patent.      Patented Apr. 5, 1910.

Application filed September 7, 1909. Serial No. 516,633.

*To all whom it may concern:*

Be it known that Moses W. Kouns, deceased, late a citizen of the United States and resident of Columbus, in the county of Franklin and State of Ohio, invented new and useful Improvements in Reversible Transmission-Gearing, of which the following is a specification, reference being had therein to the accompanying drawings.

This invention relates to reversible transmission gearing and is designed more particularly for use in connection with gasolene traction engines.

The present invention is in the nature of an improvement upon Patent No. 922,599, granted to Moses W. Kouns, May 25, 1909, and the object of the invention is to provide a gearing of the same general character shown and described in said patent which will have two forward speeds and a reverse; in which the intermediate gear for obtaining the reverse may be moved into and out of its operative position without interrupting the movement of the driving shaft or the pinion carried thereby; in which the several gears comprising the transmission and reversing gearing may be disconnected from the driving shaft and rendered inoperative when the engine is employed for stationary work, thereby eliminating a large portion both of the friction on the shaft and of the wear on the gearing, and also eliminating the noise incident to the running of these parts; and further, to so construct and arrange the several parts comprising the transmission and reversing gearing as to render the same very compact and to utilize a minimum number of parts.

With these objects in view the invention consists in certain novel features and in certain combinations and arrangements of parts hereinafter to be described, and then more particularly pointed out in the claims.

In the accompanying drawings, Figure 1 is a top plan view, partly in section, of a portion of a traction engine showing the invention applied thereto; Fig. 2 is a sectional view, taken on the line *x x* of Fig. 1, showing the transmission and reversing gears in elevation; and Fig. 3 is a detail view, partly in section, of the reversing mechanism.

These drawings illustrate one embodiment of the invention and show a portion of the main frame of a gasolene traction engine of ordinary construction. Inasmuch as the traction engine as a whole does not form a part of the present invention, only so much of the same is here shown as is necessary to an understanding of the invention.

The main frame of the engine is indicated at 1 and a crank-shaft or driving-shaft 2 is journaled in suitable bearings 3 which are supported by the main frame. This shaft is preferably arranged some distance above the main frame and is provided with a fly wheel 4, which, of course, is rigidly secured thereto and has a hub 5. A friction member or wheel 6 is rigidly mounted on the shaft 2, preferably by securing the same to the hub 5 of the fly wheel 4. In the present instance this friction member consists of a disk or web 7 having an annular flange 8 on one side thereof extending about and rigidly secured to the hub 5 of the fly wheel. An annular flange 9 is secured to the edge of the disk 7 and extends for some distance on opposite sides thereof. Mounted on this flange and rigidly secured thereto is a suitable friction material 10, such as paper, leather or the like.

Rigidly secured to the shaft 2 and preferably near the outer end thereof is one member, 11, of a clutch mechanism which is adapted to coöperate with a second member, 12, which is rigidly secured to, and preferably formed integral with, a sleeve 13 loosely mounted upon the shaft 2 and extending from the clutch member 11, which is fixed to the shaft, to the disk 7 forming a part of the friction member 6. Two pinions 14 and 15 are slidably mounted on the sleeve 13 and are held against rotation relatively thereto, preferably by a key 16 extending longitudinally to the sleeve. These pinions are independently movable on the sleeve and each is provided with a collar or hub portion 17 having a groove 18 adapted to receive the usual yoke, by means of which the gears are moved on the sleeve, which yoke is not here shown as it is of ordinary construction. The pinions 14 and 15 are adapted to mesh with gears 19 and 20, respectively, which gears are mounted on a shaft 21. This shaft 21 extends transversely of the traction engine and has at its opposite ends pinions 22, one only of which is here shown. These pinions mesh with the driving gears 23 on the traction wheels 24.

The gears 19 and 20 may be mounted on the shaft 21 in any suitable manner, but, in the preferred construction, the larger gear 20 is connected to the shaft 21 by means of a compensating gearing 25 which may be of any desired construction, and the gear 19 is rigidly secured to one side of the gear 20, thus connecting the two gears to the shaft through the medium of a single compensating gearing. It will be noted that while the two pinions 14 and 15 may both be moved into their inoperative positions, i. e., out of mesh with their respective gears at one and the same time, the arrangement of the grooved collars 17 between the two pinions is such as to prevent both pinions meshing with their respective gears at the same time, thus rendering it impossible to "throw in" both pinions, which would result in breakage owing to the different diameters of the pinions and gears and the fact that the pinions must rotate in unison with the driving shaft 2. The smaller of the pinions, 15, is of a diameter slightly less than the interior diameter of the flange 9 forming a part of the friction member 6 and is adapted, when moved into its inoperative position, i. e., out of mesh with its gear 20, to enter the space within this flange, thereby enabling the friction member 6 to be placed close to the operative position of the pinion and the gear 20, and adding materially to the compactness of the gearing as a whole.

An eccentric shaft 26 is journaled in bearing brackets 27, which are supported by the main frame, and has rotatably mounted thereon a pinion 28 adapted to mesh with the gear 20 and preferably so mounted on said eccentric shaft as to be moved toward and away from the gear 20 when the eccentric shaft is rotated in its bearings. A friction drum 29 is also journaled on the eccentric shaft 26 and is rigidly secured to, and preferably formed integral with, the pinion 28, and, consequently rotates in unison with that pinion. The friction drum 29 is arranged in alinement with the friction member 6 and will be moved into and out of operative engagement with that friction member when the shaft 26 is rotated in its bearings. The pinion 28 and friction drum 29 are so arranged that the movement of the shaft in its bearings will carry both members simultaneously toward their coöperating parts, but owing to the length of the teeth of the pinion and its gear, these parts will begin to mesh before the friction drum comes into engagement with the friction member on the driving shaft, and, consequently, by the time the two friction members are in operative engagement, the pinion will be firmly meshed with the gear and the movement of the shaft 2 and the friction member 6 will be transmitted to the gear 20 through the medium of the friction drum 29 and pinion 28. The movement of the pinion 28 relative to the gear 20 is here shown as sufficient to entirely withdraw the teeth of the pinion from the teeth of the gear, but, obviously, this is not an essential characteristic, it being necessary only that the contact between the friction members be interrupted. It will be apparent that the use of the intermediate gear 28 will cause the gear 20 to be revolved in a reverse direction, thus driving the traction wheels backward and it will also be apparent that, owing to the fact that the pinion 28 will mesh with its gear before the friction members come into operative engagement, the reversing mechanism may be moved into operative position without interrupting the movement of the drive shaft and the friction member 6 carried thereby, it being only necessary to move the pinions 14 and 15 into their inoperative positions. The eccentric shaft 26 has a crank arm 30, to which may be connected a suitable operating handle or lever for rotating the shaft in its bearing and thereby controlling the reversing mechanism.

It will be apparent that the construction and arrangement of the several parts of the transmission and reversing mechanism is such as to render the mechanism as a whole very compact; and that it comprises a minimum number of parts. Further, it will be seen that the several moving parts of the gearing may be rendered inoperative by disconnecting the sleeve 13 from the shaft and allowing the shaft to rotate freely therein; and that the employment of the friction devices in connection with the intermediate reversing gear enables this gear to be moved into its operative position while the driving shaft is in motion without shock to the machinery and the resulting liability of breaking the same.

I wish it to be understood that I do not desire to be limited to the details of construction shown and described, for obvious modifications will occur to a person skilled in the art.

Having thus fully described the invention, what I claim as new and desire to secure by Letters Patent, is:—

1. In a traction engine, the combination, with a driving shaft, a driven shaft, a gear mounted on said driven shaft, a pinion mounted around said driving shaft, operatively connected thereto and adapted to be moved into and out of engagement with said gear, and a friction member mounted on said driving shaft, of a second pinion adapted to be moved into and out of mesh with said gear, and a friction member secured to and rotatable with said second pinion and adapted to be moved into and out of operative engagement with the friction member on said driving shaft.

2. In a traction engine, the combination, with a driving shaft, a driven shaft, a gear mounted on said driven shaft, a pinion mounted around said driving shaft, operatively connected thereto and adapted to be moved into and out of engagement with said gear, and a friction member mounted on said driving shaft, of an eccentric shaft, a pinion mounted on said eccentric shaft, means for rotating said eccentric shaft to move said pinion into and out of mesh with said gear, and a friction drum mounted on said eccentric shaft, rigidly connected to said pinion and adapted to be moved into or out of operative engagement with the friction member on said driving shaft when said eccentric shaft is rotated.

3. In a traction engine, the combination, with a driving shaft, a driven shaft, a plurality of gears mounted on said driven shaft, and a corresponding plurality of pinions extending about said driving shaft, operatively connected thereto and movable longitudinally thereof to cause the same to mesh with the respective gears on said driven shaft, means for holding said pinions against rotation relatively to said driving shaft, and a friction member rigidly secured to said driving shaft, of an eccentric shaft rotatably mounted near said gears, a pinion journaled on said eccentric shaft and adapted to be moved into or out of mesh with one of said gears when said eccentric shaft is rotated, and a friction drum mounted on said eccentric shaft, rigidly connected to said pinion and adapted to be moved into operative engagement with the friction member on said driving shaft after said pinion has meshed with said gear.

4. In a traction engine, the combination, with a driving shaft, a driven shaft, a gear extending about said driven shaft, means for connecting said gear to said shaft, a second gear of less diameter than the first-mentioned gear and rigidly connected to said first-mentioned gear, two pinions mounted around said driving shaft, operatively connected thereto and movable longitudinally thereof to cause the same to be moved into and out of mesh with the respective gears, and a friction member rigidly secured to said driving shaft, of an eccentric shaft rotatably mounted near said gears, a pinion journaled on said eccentric shaft and adapted to be moved into and out of mesh with one of said gears when said eccentric shaft is rotated in its bearings, a friction member mounted on said eccentric shaft, connected to said pinion and adapted to be moved into engagement with the first-mentioned friction member when said eccentric shaft is rotated, and means for actuating said eccentric shaft.

5. In a traction engine, the combination, with a driving shaft, a driven shaft, a gear mounted on said driven shaft, a pinion extending about said driving shaft, movable longitudinally thereof to move the same into and out of mesh with said gear and held against rotation relatively to said driving shaft, and a friction member rigidly secured to said driving shaft near said pinion and having a recess in one side thereof, in which said pinion fits when moved out of mesh with said gear, of a pinion movably mounted near said gear, adapted to be moved into and out of mesh therewith, and a friction member rigidly secured to and rotatable with said pinion and adapted to be moved into or out of operative engagement with the friction member on said driving shaft when said pinion is moved into or out of mesh with said gear.

6. In a traction engine, the combination, with a driving shaft, a driven shaft, a plurality of gears mounted on said driven shaft, a sleeve journaled on said driving shaft, clutch mechanism for connecting said sleeve to said driving shaft, a plurality of pinions mounted on said sleeve and slidable thereon to move the same into and out of mesh with the respective gears, a hub portion secured to each of said pinions and arranged between the adjacent faces thereof, a friction member mounted on said shaft at one end of said sleeve and having a recess adapted to receive one of said pinions when said pinion is moved out of mesh with its gear, of an eccentric shaft, a pinion journaled on said shaft, a friction drum journaled on said shaft and rigidly connected to said pinion, and means for rotating said shaft to move said pinion into mesh with one of said gears and to move said friction drum into engagement with the friction member on said driving shaft.

7. In a traction engine, the combination, with a driving shaft, a driven shaft, a plurality of gears extending about said driven shaft, means for connecting said gears to said shaft, a sleeve journaled on said driving shaft, clutch mechanism for operatively connecting said sleeve to said shaft, a plurality of pinions slidably mounted on said sleeve, held against rotation relatively thereto and adapted to be moved into and out of mesh with the respective gears, and a friction member rigidly secured to said driving shaft at one end of said sleeve and having a recess adapted to receive one of said pinions when it is moved out of mesh with its gear, of an eccentric shaft rotatably mounted near said gears, a pinion journaled on said shaft and adapted to mesh with one of said gears, a friction drum journaled on said shaft, rigidly connected to said pinion and adapted to be moved into operative engagement with the friction member on said driving shaft, and means for rotating said eccentric shaft to move said pinion into mesh with said gear and said friction drum into engagement with the friction member on the driving shaft.

8. The combination, with a driven gear, a driving pinion adapted to be moved into and out of engagement with said gear, and a friction member operatively connected to said pinion, of a second pinion supported near said gear and adapted to mesh therewith, and a friction member operatively connected to said second pinion and adapted to be moved into and out of engagement with the first-mentioned friction member.

9. In a traction engine, the combination, with a driving shaft and a driven shaft, means for operatively connecting said driving shaft to said driven shaft, and a friction member mounted on said driving shaft, of a pinion adapted to be operatively connected to said driven shaft, and a second friction member operatively connected to said pinion and adapted to be moved into and out of operative engagement with the friction member on said driving shaft.

10. In a traction engine, the combination, with a driving shaft, a driven shaft, a gear mounted on said driven shaft, a pinion mounted around said driving shaft, operatively connected thereto and adapted to be moved into and out of engagement with said gear, and a friction member mounted on said driving shaft, of a second pinion adapted to mesh with said gear, and a friction member connected to and rotatable with said second pinion and adapted to be moved into and out of operative engagement with the friction member on said driving shaft.

In testimony whereof, I affix my signature in the presence of two witnesses.

ALLEN B. WHITNEY,
*Administrator*

Witnesses:
RICHARD CARTER,
D. C. PARKER.